Nov. 29, 1966 W. BERTRAM 3,288,043
INDICATOR DEVICE FOR CAMERAS WITH AN AUTOMATIC LIGHT
EXPOSURE REGULATING DEVICE
Filed May 25, 1964 3 Sheets-Sheet 1

INVENTOR.
WILHELM BERTRAM
BY
Woodhams, Blanchard & Flynn
ATTORNEYS

Nov. 29, 1966      W. BERTRAM      3,288,043
INDICATOR DEVICE FOR CAMERAS WITH AN AUTOMATIC LIGHT
EXPOSURE REGULATING DEVICE
Filed May 25, 1964                    3 Sheets-Sheet 3

INVENTOR.
WILHELM BERTRAM
BY
ATTORNEYS

United States Patent Office 3,288,043
Patented Nov. 29, 1966

3,288,043
INDICATOR DEVICE FOR CAMERAS WITH AN AUTOMATIC LIGHT EXPOSURE REGULATING DEVICE
Wilhelm Bertram, 125 Planegger Strasse, Munich-Pasing, Germany
Filed May 25, 1964, Ser. No. 369,962
12 Claims. (Cl. 95—10)

The invention has reference to an indicator device for cameras having an automatic light regulation device which indicator device provides a color symbol appearing in the finder of the camera. More specifically, after the setting of the independent factors by the photographer, said color symbol indicates the picture-taking possibilities by the rotation of the hand of the rotatable coil instrument of the light regulation device.

A previous indicator device includes a curved track in the rotatable coil instrument which upon turning the instrument as a whole for adjusting the apparatus to the light sensitivity of the film to be used, shifts a mirror The shift mirror obtains its light from a light opening and casts the light rays onto a parabolic mirror, which directs all rays reaching it to a view window that is half white and half green. In addition, the rotatable coil instrument holds a diaphragm with an unchangeable diaphragm opening which is passed by the light reflected from the shift mirror to the parabolic mirror. The rotatable coil instrument is equipped with a double hand which at one end bears a transparent red flag. Dependent on the position of the hand, this flag is inside or outside the ray path. The other end of the hand fluctuates above a fixed diaphragm scale visible in a window of the housing. This scale, in addition to the number for the smallest diaphragm opening, also shows a red field and can also be covered by a red slide which is attached to the rotatable coil instrument. When film sensitivity and exposure time are fixed, the rotatable coil instrument is turned correspondingly. If the light causes a definite deflection of the hand, the result will be that the red flag at the end of the hand is either beside the ray path and the finder shows the green and white colors, or else the flag appears in the ray path and colors it red, thus overlying the green-white coloration. This will show whether the preselected time leads to a correct light exposure or not. In addition, the housing window makes possible the viewing of the diaphragm scale, which during the turning of the rotatable coil instrument is more or less covered by the red slide. After the resting of the hand according to the illumination, it is possible to determine by a glance through the window whether the end of the hand is in the uncovered field of the diaphragm scale or not.

This indicator device is rather complicated, however, and also needs a considerable amount of space, because the parts must be arranged on both sides of the rotatable coil instrument.

The present invention aims at an overcoming of these difficulties. For this purpose, the indicator device of the kind described above is developed further in such a manner that a transparent disk is attached to the hand of the rotatable coil instrument behind a light aperture, on which disk several diaphragm scales are found in circumferential areas of varying radii. The areas of these diaphragm scales are bounded by a color field on one end, and on the other end are partially overarched by an additional field of the same color, for instance, red. In the ray path of the light below the disk, a mirror can be adjusted radially with respect to the center of the rotatable coil instrument from the inner to the outer circumferential area of the disk and mirrors that part of the disk area which is within the ray path into the finder or the view window. The area of the disk which lies in the ray path depends on the adjustment of the regulator device for the light sensitivity of the film to be used and for the desired exposure time.

This procedure accomplishes a very compact, simple construction of the indicator device. It is possible to arrange the essential parts on one side of the rotatable coil instrument. Another advantage of the new indicator device is to be found in the fact that not only will the proper color symbol be seen in the finder or viewer window but also the diaphragm will be adjusted automatically according to the position of the hand of the rotatable coil instrument. Finally, the viewing window will also show whether the preselection of the exposure time approaches the area of overexposure or underexposure. In spite of the automatic light regulation, it will be possible, therefore, to have some personal influence which sometimes may be very desirable (i.e. backlit pictures, portraits, and other pictures presenting light problems).

In the new indicator device, in addition, only one end of the hand of the rotatable coil instrument is needed. Thus, the other end is free to be used for the automatic adjustment of the diaphragm of the camera, this free end, for example, being made to cooperate with a known control in the form of an indicator brake and a revolvable step cylinder.

So that the disk with the diaphragm scales can be maintained as small as possible, it is advisable to linearize the measuring device of the rotatable coil instrument in any convenient manner and, as a result, to arrange the diaphragm numbers of each scale at equal distances from each other. Thus, the disk in the area of the diaphragm numbers may be different in color from those in the area of adjoining fields, with a green color perhaps most advisable, so that the field of the diaphragm numbers is distinguished particularly clearly from the adjoining fields.

The mounting of the adjustable mirror can be according to any desired method. However, in order to accomplish a satisfactory slide path in a simple manner and without disturbing construction features, the mirror is perhaps best attached to a carriage. A drive is inserted between the rotatable coil instrument and the carriage which transforms the rotation as a whole of the rotating coil instrument into a movement of the carriage. This drive can consist of a control cam participating in the rotation of the rotatable coil instrument and a rocker arm swivelable around a fixed axis and having a peg bearing on the control cam. The end of the rocker arm has a further peg which enters into an elongated hole in the carriage. The use of the rocker arm makes possible a more extensive route, without any interference by the shaft of the rotatable coil instrument. The control cam without any difficulty also allows a form where the angular displacement of the rotatable coil is related to the linear displacement of the mirror by a constant.

The carriage is suitably equipped with a bar conducted on two bearings which are arranged on a common frame which frame is pivotably mounted at one end thereof. Thus, the mirror can easily be adjusted with regard to the rotatable coil device. The bar has a spring telescoped thereover for pressing the peg of the rocker arm against the control cam.

An especially simple, space-saving device for the preselection of film sensitivity and of time is present if the rotatable coil instrument is coupled by means of a peg with a control element of the camera shutter, into which is built a differential adjustment device acting upon the control element, which device is activated by setting the camera for the light sensitivity of the film to be used as well as for the desired exposure time.

Additional characteristics of the invention are shown in the following description and in the drawings which illustrate a preferred embodiment of the invention.

Figure 1:
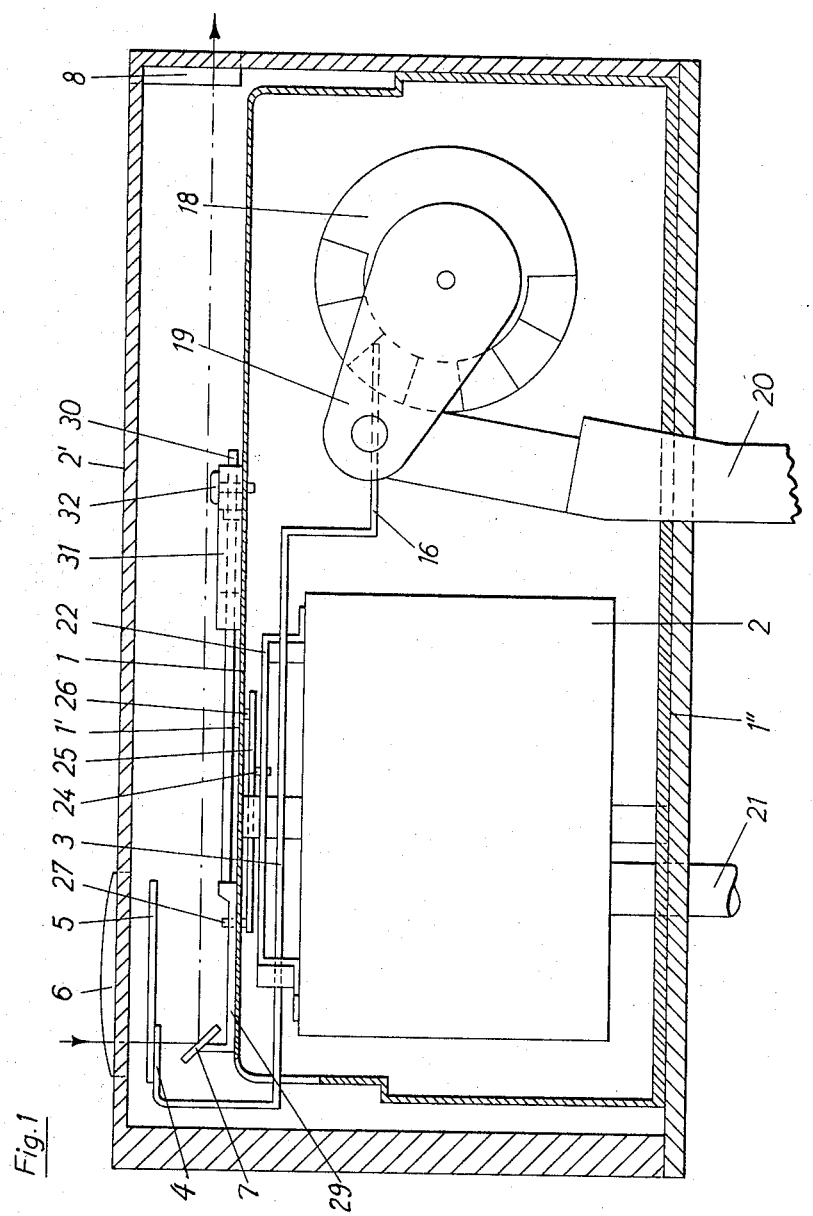
FIGURE 1 is a broken side elevational view of the indicator device in a housing.
Figure 2:
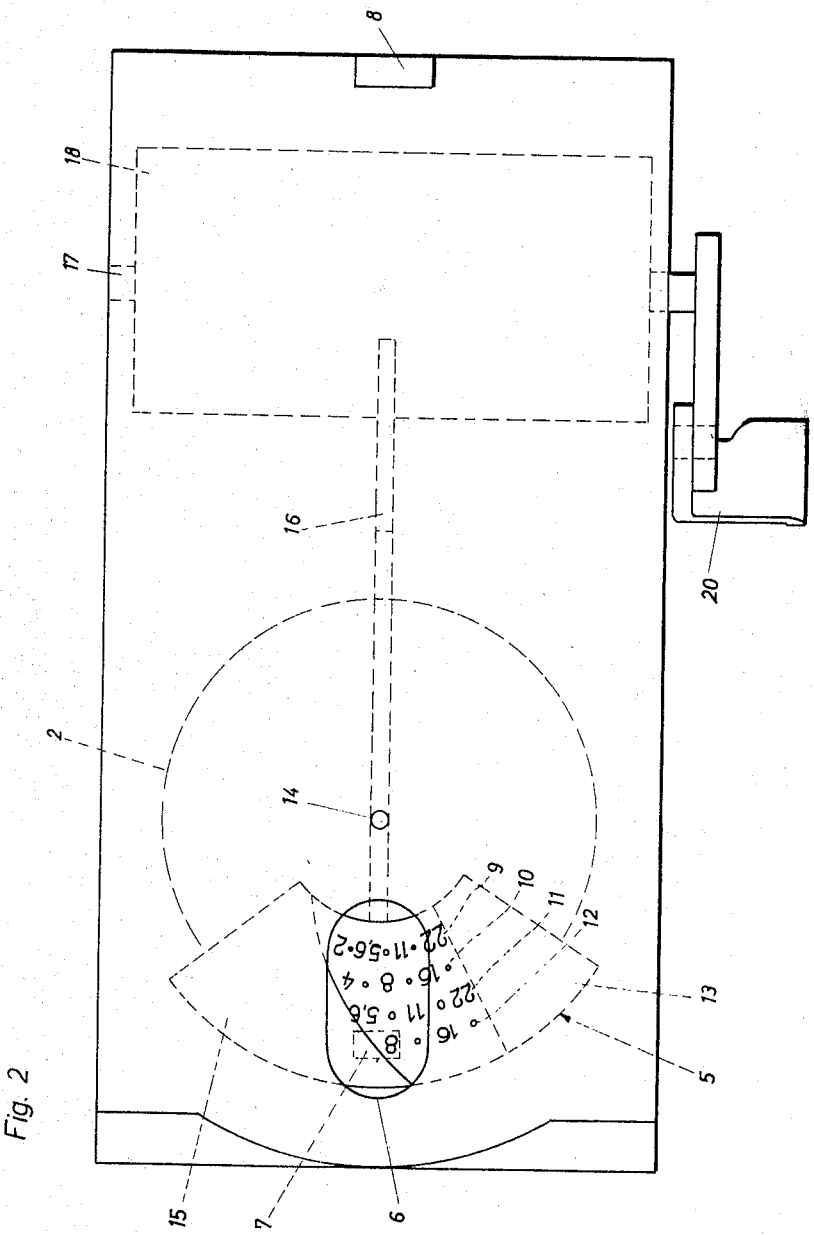
FIGURE 2 is a top view of the device of FIGURE 1.

As can be seen from FIGURE 1, inside an inner housing 1 is found a rotatable coil instrument 2, whose hand 3 protrudes from a front (leftward in FIGURES 1 and 2) end opening of housing 1 and at angular end 4 carries transparent disk 5. Upper side 1' of inner housing 1 is at a distance surrounded by outer housing 2', so that a hollow space exists between the upper surface 1' of inner housing 1 and the outer housing 2'. Disk 5 is in this hollow space. On the upper side of outer housing 2' is found a light-admitting aperture 6 (FIGURE 2), which can also be constructed as an outwardly convex lens in the familiar manner. In the light path below disk 5 is found mirror 7 which reflects the entering light rays along a line substantially parallel with upper surface 1' of inner housing 1 to light exit 8 at the end of housing 2'. As seen in FIGURE 2, disk 5 shows in circumferentially extending areas of various radii diaphragm scales 9, 10, 11 and 12. On one circumferential end (end with the smallest diaphragm opening), the portion of the disk 5 bearing the diaphragm numbers is bounded by red color field 13, with the boundary line being formed by a straight line which runs approximately radially to the shaft 14 of rotatable coil instrument 2. On the other end of the disk (end with the largest diaphragm opening) a red color area 15 is found which, however, partially covers the segment of the disk bearing the diaphragm numbers. The boundary line between diaphragm scales 9, 10, 11 and 12 and red color area 15 traverses an arc which with regard to shaft 14 of the rotatable coil instrument 2 has a spiral shape. Disk 5 is colored green in the area of diaphragm scales 9, 10, 11 and 12.

Hand 3 of rotatable coil instrument 2 is equipped with rear extension 16 which cooperates with a control device of a known type for the purpose of adjusting the diaphragm opening. This control device in the present embodiment consists of an indicater brake (not shown) located rotatably on shaft 17 and of step cylinder 18 rotatable around the same shaft. The sleeve of the step cylinder is cut open on the side turned toward hand end 16 and bevelled in step form, so that depending on the position of the hand end 16, cylinder 18 can be turned more or less far. Since this kind of control device is already known in connection with light regulation devices, it is not necessary to give a detailed description at this point. Shaft 17 of cylinder 18 is extended on one end outwardly through the side wall of the outer housing 2' and is provided with lever arm 19, which is activated by diaphragm level 20.

Underside 1" of inner housing 1 and the bottom of the outer housing 2' are provided with suitable, preferably arcuate, cutouts, through which coupling peg 21 downwardly projects, which coupling peg 21 is solidly connected with rotatable coil instrument 2 (FIGURE 1).

As is shown by FIGURE 2, the diaphragm members of each sector field 9, 10, 11 and 12 are spaced at equal distances from each other. To be able to use such a compact diaphragm scale, a measuring device is used for the light regulation device which is linearized in a known manner. In the embodiment shown in FIGURE 2, those diaphragm numbers which would be found in red field 15 are omitted. However, it would be possible to show all diaphragm numbers completely on the scale. Furthermore, in the example according to FIGURE 2, alternate diaphragm numbers are omitted in each of the diaphragm scales 9, 10, 11 and 12 and are replaced by dots. Thus, diaphragm scale 9 begins with the number of the largest diaphragm opening, followed by a dot, while in scale 10 the dot is shifted by one diaphragm number. In the other scales 11 and 12 the same shifting of the dots is carried out.

Figure 3:
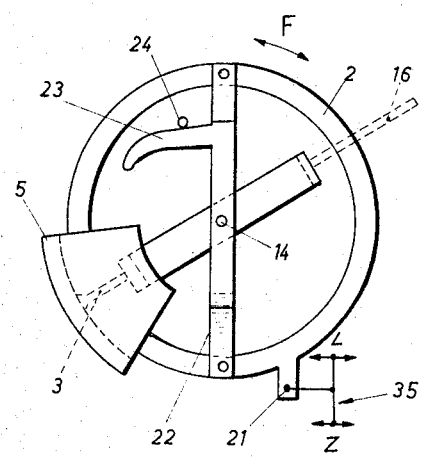
FIGURE 3 is a top view of the rotatable coil instrument.
Figure 4:
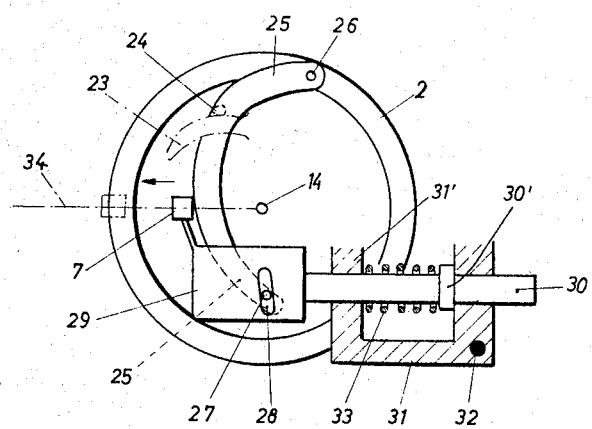
FIGURE 4 is a top view of the drive inserted between the rotatable coil instrument and the mirror.

Attached to the topside of rotatable coil instrument 2 is loop 22 (FIGURE 3) which, seen from the side, is constructed in somewhat of a U-shape which participates in the rotation as a whole of rotatable coil instrument 2 in the direction of double arrow F. Branching off from loop 22 is control cam 23, against which lies peg 24. This peg 24 is attached to the underside of rocker arm 25 (FIGURE 4). One end of rocker arm 25 is pivotally mounted on a fixed bolt 26 attached inside of inner housing 1. Rocker arm 25 is curved so that the shaft 14 of the rotatable coil instrument cannot interfere with its pivotal movement. Free end 25' of rocker arm 25 enters with peg 27 into oblong hole 28. This hole 28 extends through plate-like bracket 29 of mirror 7. This plate-like bracket 29 rests on upper side 1' of inner housing 1 and is guided by bar 30 attached to it. Frame 31 serves as a support for bar 30 and is pivotable on topside 1' of the inner housing 1 around fixed screw 32 which can be tightened. Between carrying side 31' of frame 31 and point 30' of bar 30 is spiral spring 33 which maintains peg 24 locked against control cam 23. Mirror 7 is attached to bracket 29 in such a manner that it moves on radial line 34 from its radially innermost position shown in unbroken lines to its outer position shown in broken lines. To accomplish an exact setting frame 31 can be pivoted around screw 32 and then it can be locked in the correct position by tightening screw 32.

Control cam 23 has a shape that causes equal angular displacements of measuring device 2 to result in equal linear displacements of mirror 7. Mirror 7 in its inner position stands under diaphragm scale 9 and in its outer position under diaphragm scale 12. Set into light admission opening 6 is a lens (not shown) which focuses the incoming light onto the area traversed by the mirror 7.

Coupling peg 21 (FIGURE 3) is connected with a differential adjusting device designated in its entirety as 35. This device is indicated schematically as a balance beam. At end L, its activation in the direction of the two arrows determines the film sensitivity; end Z determines the time. Both, by way of coupling peg 21, bring about an angular displacement of rotatable coil device 2 as a whole about the axis of shaft 14. Differential adjusting device 35 can constitute a part of the camera shutter, so that the change can be carried out from the shutter.

The device works as follows:

Corresponding to the film used, the film sensitivity is adjusted at end L of the differential adjusting device and in doing so rotatable coil instrument 2 is rotated as a whole about the axis of shaft 14 to an appropriate extent. Then the desired exposure time is set at the other end Z, say 1/1500 seconds for a snapshot. Rotatable coil device 2 is now in a definite position. Simultaneously and due to such movement of the instrument 2, mirror 7 is also put into a definite position along radial line 34 by way of rocker arm 25, peg 24 and control cam 23.

Meanwhile hand 3 of rotatable coil instrument 2 has now also swung into a position determined by the light present, so that mirror 7 and disk 5 stand in a definite position with regard to each other. Let us assume that this position is shown in FIGURE 2. There mirror 7 is in its radially outermost position with respect to instrument 2 and disk 5 has assumed a middle position. This means that in the finder of the camera or in a view window the diaphragm number 8 and a part of red field 15 can be seen, so that the photographer can discover whether he is close to the limits of light possibilities and whether the danger of a wrong exposure exists. This danger the photographer can eliminate only by changing the time adjustment and thus simultaneously rotating the rotatable coil instrument 2 as a whole and moving the mirror 7 along the line 34. It is also necessary to consider that by the angular adjustment of rotatable coil device 2, hand 3 is also shifted because of the prevailing magnetic field, so that diaphragm number 11 of diaphragm scale 11 appears in mirror 7. This means that no part of red field 15 is visible any longer. This adjustment produces the proper exposure.

It should be stressed that in a somewhat less favorable construction, the diaphragm indications on disk 5 can be omitted, so that this area is only colored green. However, the diaphragm scales enable the photographer to determine the diaphragm setting by a single glance into the finder and if necessary to bring about the proper change. In addition, the indicator device can also be used when the automatic exposure regulation is eliminated, which is an especially favorable feature.

Although a particular preferred embodiment of the invention has been disclosed above for illustrative purposes, it will be understood that variations or modifications thereof which lie within the scope of the appended claims are fully contemplated.

What is claimed is:

1. In an indicator device for a camera of the type having an automatic light exposure regulating device including a light measuring device, said indicator device presenting a color symbol in an observation window of said comera which, after presetting of said indicator device to various preselectable parameters, indicates whether a successful exposure may be made, the combination comprising:

a rotatable coil device and a hand affixed to the moving member of said device for rotation therewith;
a transparent disk attached to said hand, said disk having a diaphragm scale in each of several concentric areas of various radii, said disk having a color field at one end thereof and a second color field at the other end thereof, the circumferentially inner edge of said second color field being arcuate;
a light entrance on one side of said disk;
a mirror on the other side of said disk opposite said light opening for reflecting the image of a portion of said disk into the observation window;
means for adjusting said mirror radially along said disk in accordance with ones of said preselectable parameters.

2. The indicator device defined in claim 1, wherein the measuring device of the light exposure regulation device is linearized and said diaphragm numbers in each of said concentric areas are arranged at equal distances from each other.

3. The indicator device defined in claim 1, wherein said disk in the area of the diaphragm numbers is of a color different from said color fields.

4. The indicator device defined in claim 1 including a carriage to which said mirror is attached and a drive between said rotatable coil device and carriage which transforms the rotation as a whole of the rotatable coil device into a movement of the carriage.

5. The indicator device defined in claim 4 wherein the drive consists of a control cam which rotates with the rotatable coil device as a whole, and a rocker arm pivotable around a fixed axis and having a peg for following the contour of the control cam, the end of said rocker arm having a further peg engaged in an elongated hole on said carriage.

6. The indicator device defined in claim 5 wherein the control cam is so curved that the angular displacement of the rotatable coil device and the linear displacement of the mirror are related by a constant.

7. The indicator device defined in claim 4 wherein the carriage is equipped with a bar which can be shifted on two bearings.

8. The indicator device defined in claim 7, wherein said bearings are arranged on a common frame which for the purpose of adjusting the mirror is at one end pivoted about a fixed point.

9. The indicator device defined in claim 7 including a spring telescoped on said bar for pressing the peg of said rocker arm against the control cam.

10. The indicator device defined in claim 1, wherein said hand of the rotatable coil instrument is equipped with a backward extension which cooperates with a control in the form of a hand brake and a revolvable step cylinder in the automatic approximation of the diaphragm setting.

11. The indicator device defined in claim 1 including a lens in said light entrance for focusing the light on the area traversed by the mirror during movement of said mirror.

12. The indicator device defined in claim 1 wherein said rotatable coil device is coupled with a control element of the camera shutter by means of a peg into which shutter is built a differential adjustment device for acting on the control element, which differential adjustment device is activated when the camera is adjusted to conform to the sensitivity of the film to be used and for exposure time.

No references cited.

NORTON ANSHER, *Primary Examiner.*

J. F. PETERS, JR., *Assistant Examiner.*